United States Patent
Papakonstantopoulos et al.

(10) Patent No.: US 12,018,154 B2
(45) Date of Patent: Jun. 25, 2024

(54) RUBBER COMPOSITION OFFERING HIGH STIFFNESS AND LOW HYSTERESIS

(71) Applicant: THE GOODYEAR TIRE & RUBBER COMPANY, Akron, OH (US)

(72) Inventors: George Jim Papakonstantopoulos, Medina, OH (US); Michael Joseph Rachita, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 227 days.

(21) Appl. No.: 17/543,922

(22) Filed: Dec. 7, 2021

(65) Prior Publication Data

US 2022/0195153 A1 Jun. 23, 2022

Related U.S. Application Data

(60) Provisional application No. 63/126,576, filed on Dec. 17, 2020.

(51) Int. Cl.
| | | |
|---|---|---|
| *C08L 9/06* | (2006.01) | |
| *B60C 1/00* | (2006.01) | |
| *B60C 11/00* | (2006.01) | |

(52) U.S. Cl.
CPC .............. *C08L 9/06* (2013.01); *B60C 1/00* (2013.01); *B60C 1/0016* (2013.01); *B60C 11/0008* (2013.01); *B60C 2001/005* (2013.01); *B60C 2001/0058* (2013.01); *B60C 2011/0025* (2013.01); *C08L 2205/03* (2013.01)

(58) Field of Classification Search
CPC .......... C08L 9/06; C08L 2205/03; B60C 1/00; B60C 1/0016; B60C 11/0008; B60C 2001/005; B60C 2001/0058; B60C 2011/0025
See application file for complete search history.

(56) References Cited

U.S. PATENT DOCUMENTS

| | | |
|---|---|---|
| 5,885,389 A | 3/1999 | Sandstrom et al. |
| 6,776,206 B1 | 8/2004 | Segatta et al. |
| 7,231,951 B2 | 6/2007 | Sandstrom et al. |
| 8,539,999 B2 | 9/2013 | Pingenat et al. |
| 10,052,918 B2 | 8/2018 | Schweitzer et al. |
| 10,239,363 B2 | 3/2019 | Schweitzer et al. |
| 10,494,504 B2 * | 12/2019 | Galizio .................... C08L 9/00 |
| 2017/0355834 A1 * | 12/2017 | Sandstrom ............ B60C 1/0025 |
| 2020/0317892 A1 | 10/2020 | Deparis et al. |
| 2020/0332089 A1 * | 10/2020 | Kanbara ................... C08L 9/00 |
| 2020/0385559 A1 | 12/2020 | Deparis et al. |

FOREIGN PATENT DOCUMENTS

| | | | |
|---|---|---|---|
| CN | 110551140 A | * 12/2019 | .......... C07D 493/10 |
| EP | 3888940 A1 | 10/2021 | |

OTHER PUBLICATIONS

English machine translation of CN 110551140 (Year: 2019).*
European Search Report dated Apr. 19, 2022 for European Patent Application No. EP21212426 which is the European counterpart to the subject patent application.

* cited by examiner

*Primary Examiner* — Angela C Scott
(74) *Attorney, Agent, or Firm* — Alvin T. Rockhill

(57) ABSTRACT

This invention is based upon the discovery that benzoxazine resins can be incorporated into certain rubber compositions to increase the stiffness thereof without increasing hysteresis or reducing tear strength. Such benzoxazine resin reinforced rubber formulations can accordingly be used beneficially in components of rubber products where high stiffness is desirable. Since these benzoxazine resin reinforced rubbers do not increase levels of hysteresis, they can be used in tires components, such as apexes, chaffers, and high stiffness tread blocks without compromising fuel efficiency. This invention more specifically reveals a radial tire having an apex, a chaffer, or a hard tread block segment which is comprised of a rubbery polymer and a benzoxazine resin.

20 Claims, 1 Drawing Sheet

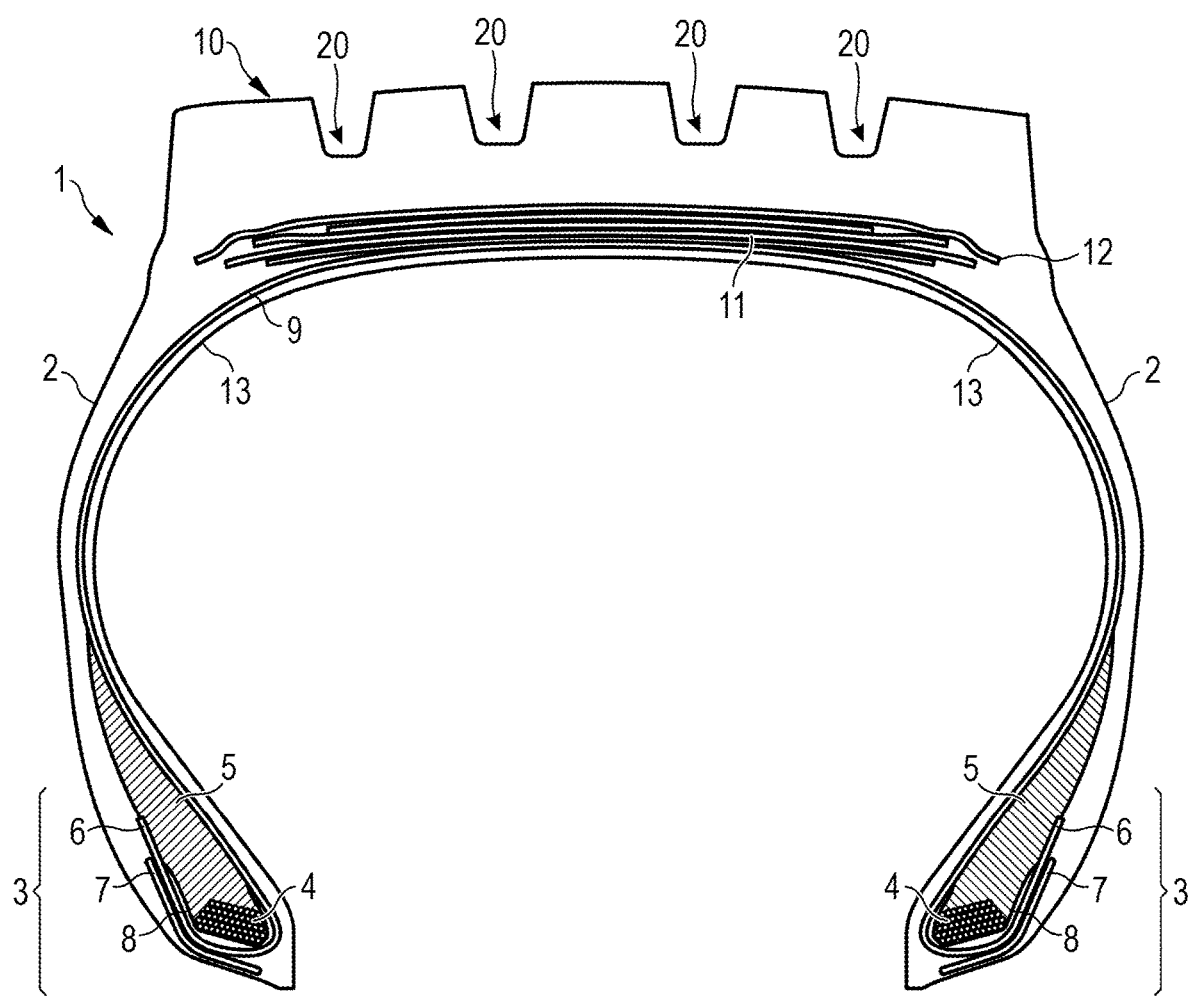

1

RUBBER COMPOSITION OFFERING HIGH STIFFNESS AND LOW HYSTERESIS

This application claims benefit of U.S. Provisional Patent Application Ser. No. 63/126,576 filed on Dec. 17, 2020. The teachings of U.S. Provisional Patent Application Ser. No. 63/126,576 are incorporated herein by reference in their entirety.

FIELD OF THE INVENTION

The present invention relates to a rubber composition having high stiffness, good tear strength, and which exhibits low levels of hysteresis. This rubber formulation is of particular value for utilization in tire apex, tire chafer, and high stiffness tire tread blocks.

BACKGROUND OF THE INVENTION

Pneumatic rubber tires conventionally have two spaced apart, relatively inextensible beads, usually composed of twisted, or cabled, metallic wires which are surrounded by rubber components. A significant component which is conventionally positioned around a portion of the bead is the chafer. The chafer is a rubber composition conventionally designed to contact a rigid wheel rim and, therefore, interface between the tire and rim. The chafer rubber composition should be very abrasion resistant, tough, and have a relatively high modulus while also having acceptable flex and rubber fatigue properties as well as having good resistance to cut growth.

The chafer rubber composition is conventionally composed of a diene-based rubber composition which is carbon black reinforced. The chafer rubber composition may optionally contain textile fabric reinforcement for dimensional stability, where the textile fabric portion of the chafer is conventionally adjacent to the bead portion of the tire, leaving the rubber portion of the chafer to contact the rigid wheel rim when the tire is mounted on such rim and inflated. Rubber chafer compositions are frequently composed of cis 1,4-polyisoprene and cis 1,4-polybutadiene rubber in order to have good abrasion resistance and durability.

U.S. Pat. No. 5,885,389 discloses a pneumatic tire having a pair of spaced apart, relatively inextensible bead components, and a connecting carcass between said bead components and a rubber chafer positioned around at least a portion of each of said bead components intended for contacting a rigid rim of a wheel, wherein said chafer is a rubber composition composed of, based on 100 parts by weight rubber, (A) about 5 to about 25 phr of trans 1,4-polybutadiene polymer having at least a 70 percent trans 1,4-content and at least one melting point within a range of about 35° C. to about 65° C., (B) about 35 to about 65 phr of cis 1,4-polybutadiene rubber, (C) about 10 to about 20 phr of natural cis 1,4-polyisoprene rubber and (D) about 10 to about 30 phr of emulsion polymerization prepared styrene/butadiene copolymer rubber.

U.S. Pat. No. 7,231,951 discloses a pneumatic tire comprising a pair of spaced apart bead components, a connecting carcass between said bead components, and a rubber chafer positioned around at least a portion of each of said bead components and intended for contacting a rigid rim of a wheel, wherein said chafer comprises a self-lubricating rubber composition, the self-lubricating rubber composition comprising at least one rubber and from 2.5 phr to 5 phr of stearyl stearate, wherein the rubber composition has a coefficient of friction ranging from 2.17 to 2.38 as measured by ASTM D-1894, and wherein the tire is a heavy tire having a tread with a tread cross section of at least 4 centimeters thick.

U.S. Pat. No. 8,539,999 discloses a pneumatic tire having a pair of spaced apart bead components, a connecting carcass between said bead components, and a rubber chafer positioned around at least a portion of each of said bead components and intended for contacting a rigid rim of a wheel, wherein said chafer comprises an outer skin layer intended for contacting the rigid rim and an inner core layer disposed radially inward of the skin layer wherein the inner core layer does not contact the rigid rim; wherein the outer skin layer is constructed from a rubber composition comprising from 50 phr to 75 phr of reinforcing carbon black and the inner core layer is constructed from a rubber composition comprising from 30 phr to 40 phr of reinforcing carbon black. This patent further describes a pneumatic tire having a pair of spaced apart bead components, a connecting carcass between said bead components, and a rubber chafer positioned around at least a portion of each of said bead components and intended for contacting a rigid rim of a wheel, wherein said chafer comprises an outer skin layer intended for contacting the rigid rim and an inner core layer disposed radially inward of the skin layer wherein the inner core layer does not contact the rigid rim; wherein the outer skin layer is constructed from a rubber composition consisting of 100 phr of at least one rubber containing olefinic unsaturation; from 50 phr to 75 phr of reinforcing carbon black; at least one additive selected from the group consisting of sulfur donors, accelerators, retarders, oils, resins, tackifying resins, plasticizers, silica, ultra high molecular weight polyethylene (UHMWPE), pigments, fatty acids, zinc oxides, waxes, antioxidants, antiozonants, peptizing agents, and sulfur containing organosilicon compounds; and the inner core layer is constructed from a rubber composition consisting of 100 phr of at least one rubber containing olefinic unsaturation; from 30 phr to 40 phr of reinforcing carbon black; and at least one additive selected from the group consisting of sulfur donors, accelerators, retarders, oils, resins, tackifying resins, plasticizers, silica, ultra high molecular weight polyethylene (UHMWPE), pigments, fatty acids, zinc oxides, waxes, antioxidants, antiozonants, peptizing agents, and sulfur containing organosilicon compounds.

U.S. Pat. Nos. 10,052,918 and 10,239,363 disclose a pneumatic tire having a pair of spaced apart bead components, a connecting carcass between the bead components, a pair of sidewalls overlying the carcass, and a rubber chafer portion adjacent to each of the sidewalls and positioned around at least a portion of each of the bead components and intended for contacting a rigid rim of a wheel, the rubber chafer portion comprising a radially innermost toe guard and a chafer adjacent to a radially outer end of the toe guard; the toe guard having the radially outer end disposed at a sidewall axially outer surface and the radially outer end of the toe guard located from 3 mm radially inward from a radial center of a bead to 60 mm radially outward from the radial center of the bead; wherein a ratio of a modulus of the toe guard to a modulus of the chafer is in the range of 5 to 8; wherein the toe guard comprises a rubber composition comprising 100 parts by weight, per 100 parts by weight of elastomer (phr) of a diene based elastomer; 10 phr to 30 phr of a phenolic resin; and 40 phr to 80 phr of a carbon black having an Iodine absorption value in a range of from about 100 g/kg to about 300 g/kg; wherein the modulus is measured as G' at 1 percent strain and 100° C., and G' for the toe guard ranges from 10 MPa to 30 MPa, and G' for the chafer ranges from 2 MPa to 4 MPa.

U.S. Pat. No. 6,776,206 discloses a radial tire comprising a steel cord reinforced carcass ply and an apex of a composition comprised of, based on 100 parts by weight rubber, (A) about 80 to about 97 parts by weight of at least one diene rubber selected from the group consisting of natural rubber, synthetic cis 1,4-polyisoprene rubber and cis 1,4-polybutadiene rubber; and (B) about 3 to about 20 parts by weight of a trans 1,4-polybutadiene rubber having about 75 to about 85 percent by weight trans 1,4-content, about 12 to about 18 percent by weight of vinyl 1,2-content and about 3 to about 8 percent by weight cis 1,4-content and, in its uncured state, a first major melting point in the range of about 35° C. to about 45° C. and a second minor melting point in the range of about 55° C. to about 65° C.

The use of reinforcing resins in tire apex and chafer formulations has been used to improve tire performance characteristics. In particular, reactive resin systems based on a methylene donor and a methylene acceptor, also known as Novolak resins, which are reacted in situ while mixing the rubber composition, have been used to boost properties in different rubber compositions. However, use of such resins requires handling of methylene donors, also called formaldehyde donors, and resorcinol in the rubber mixing process which can be undesirable from an environmental, health and/or safety perspective. Moreover, there has been a demand for further improvements in reinforcement properties, in particular at limited weight and hysteresis. Accordingly, there is a continuing long felt need for resins that can be used in specific tire compounds to increase stiffness without causing an increased level of hysteresis (reduced fuel economy) or compromising tear characteristics. Rubber formulations containing such resins could be used in apex formulations, chafer formulations, or formulations in making stiff tire segments.

SUMMARY OF THE INVENTION

This invention is based upon the discovery that benzoxazine resins can be incorporated into certain rubber compositions to increase the stiffness thereof without increasing hysteresis or reducing tear strength. Such benzoxazine resin reinforced rubber formulations can accordingly be used beneficially in components of rubber products where high stiffness is desirable. Since these benzoxazine resin reinforced rubbers do not increase levels of hysteresis they can be used in tires components, such as apexes, chafers, and high stiffness tread blocks without compromising fuel efficiency.

This invention more specifically reveals a radial tire comprising a steel cord reinforced carcass ply and an apex which is comprised of a rubbery polymer and from 30 phr to 80 phr of a benzoxazine resin. The present invention more specifically discloses a tire which is comprised of a generally toroidal-shaped carcass with an outer circumferential tread which is adapted to be ground contacting, two spaced beads, at least one ply extending from bead to bead and sidewalls extending radially from and connecting said tread to said beads, two rubber apexes which are located radially above the beads, wherein the apexes are comprised of a rubbery polymer and from 30 phr to 80 phr of a benzoxazine resin.

The subject invention also discloses a tire which is comprised of a generally toroidal-shaped carcass with an outer circumferential tread which is adapted to be ground contacting, two spaced beads, at least one ply extending from bead to bead, sidewalls extending radially from and connecting said tread to said beads, and a chafer positioned around at least a portion of each of said beads, wherein the chafer is adapted for contacting a rigid rim of a wheel, wherein said chafer is comprised of a rubbery polymer and from 30 phr to 80 phr of a benzoxazine resin.

The present invention also describes a tire which is comprised of a generally toroidal-shaped carcass with an outer circumferential tread which is adapted to be ground contacting, two spaced beads, at least one ply extending from bead to bead, and sidewalls extending radially from and connecting said tread to said beads, wherein said tread is comprised of soft tread segments and hard tread segments, and wherein the hard tread segments are comprised of a rubbery polymer and from 30 phr to 80 phr of a benzoxazine resin.

The subject invention further discloses a rubber composition which is comprised of a polydiene rubber, from 30 phr to 80 phr of a benzoxazine resin, and at least 30 phr of silica; wherein said composition is void of isoprene containing polymers.

One object of the present invention may be to provide an advanced rubber composition having improved reinforcement properties. Another object of the present invention may be to provide a rubber composition having good stiffness properties which exhibit a low level of hysteresis.

Another object of the invention may be to provide a rubber composition allowing for a reduction of methylene donors handled during manufacturing of the rubber composition. Another object of the invention may be to provide cost-efficient alternatives for existing reactive resin systems.

BRIEF DESCRIPTION OF THE DRAWINGS

The structure, operation, and advantages of the invention will become more apparent upon contemplation of the following description taken in conjunction with the accompanying drawings, wherein FIG. 1 is a schematic cross section of a tire comprising a rubber component with the rubber composition in accordance with an embodiment of the present invention.

DETAILED DESCRIPTION OF THE INVENTION

The benzoxazine utilized in the practice of this invention has at least one of the following structures:

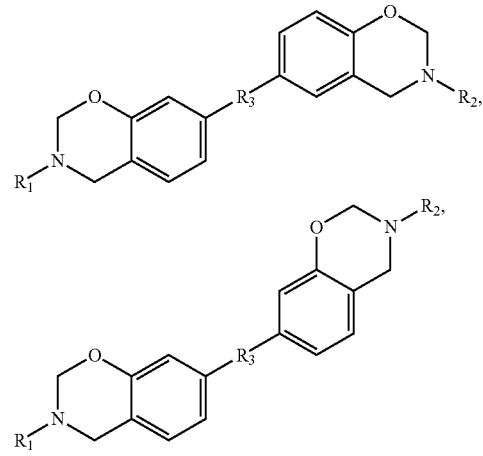

wherein $R_1$ and $R_2$ are selected from aromatic groups, aliphatic groups, cycloaliphatic groups and heterocyclic groups, and wherein $R_3$ is an aromatic group, aliphatic group, cycloaliphatic group, heterocyclic group, hexafluoropropane, a monosulfide (S), or a disulfide (S—S). As visible in the above structural drawings, ortho and para positions are available, where $R_3$ is bound in meta position. This improves further the crosslinking in the rubber network. In one embodiment, $R_1$ and $R_2$ are selected from ethanol, allyl, methyl, ethyl, propyl, isopropyl, hexyl, cyclohexyl, fluorene, phenyl acetylene, propargyl ether benzyl, benzonitrile, furfuryl, and benzyl groups. In still another embodiment, $R_3$ is disulfide (S—S).

In still another embodiment, the rubber composition is a sulfur vulcanizable (i.e. non-vulcanized or uncured) rubber composition comprising less than 2 phr, preferably less than 1 phr, even more preferably less than 0.5 phr of a methylene donor and/or less than 5 phr of a methylene acceptor (such as present in a reactive resin system).

In still another embodiment, the rubber composition comprises a further benzoxazine based on the reaction of a phenol and a primary amine. For instance, the further or second benzoxazine may be one or more of a monofunctional benzoxazine and a main-chain benzoxazine. In particular, such second benzoxazines bearing at least one functional group (e.g. bearing a silane, a long alkyl chain or a carboxylic acid) may provide an additional function and may be integrated in the benzoxazine network after the curing step. They may further help to improve processability, reinforcement and/or hysteresis, and/or improve interaction with fillers, rubber and/or the curing package.

The rubber compositions of this invention will typically be comprised of 5 phr to 80 phr, or 5 phr to 9 phr, or 10 phr to 20 phr, or 20 phr to 40 phr, or 40 phr to 80 phr of the benzoxazine resin.

In an embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, an emulsion polymerization derived styrene-butadiene (ESBR) might be used having a styrene content of 20 to 28 percent bound styrene or, for some applications, an ESBR having a medium to relatively high bound styrene content, namely a bound styrene content of 30 to 45 percent. In many cases, the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher. In some embodiments of this invention the rubber formulation is void of isoprene containing polymers.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95 to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature (Tg) of an elastomer or elastomer composition, where referred to herein, represents the glass transition temperature(s) of the respective elastomer or elastomer composition in its uncured state or possibly a cured state in the case of an elastomer composition. A Tg can be suitably determined as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 to 5 phr, of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound" and "composition" and "formulation" may be used herein interchangeably, unless indicated otherwise.

In an embodiment, the rubber composition may also include oil, in particular, a processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition may also include up to 70 phr of processing oil, preferably between 5 and 25 phr, or alternatively less than 10 phr oil, and preferably less than 5 phr.

In an embodiment, the rubber composition may include silica. Commonly employed siliceous pigments which may be used in the rubber compound include, for instance, conventional pyrogenic and precipitated siliceous pigments (silica). In one embodiment, precipitated silica is used. The conventional siliceous pigments may be precipitated silicas such as, for example, those obtained by the acidification of a soluble silicate, e.g. sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area can be suitably determined according to ASTM D6556 or equivalent and is described in the Journal of the American Chemical Society, Volume 60, Page 304 (1930). The conventional silica may also be characterized by having a dibutylphthalate (DBP) absorption value in a range of 100 $cm^3$/100 g to 400 $cm^3$/100 g, alternatively 150 $cm^3$/100 g to 300 $cm^3$/100 g, which can be suitably determined according to ASTM D 2414 or equivalent. A conventional silica might be expected to have an average ultimate particle size, for example, in the range of 0.01 to 0.05 micron as determined by the electron microscope, although the silica particles may be even smaller, or possibly larger, in size. Ranges of silica use could be for instance between 5 and 120 phr, preferably between 20 and 70 phr or 80 to 120 phr. Various commercially available silicas may be used, such as, only for example herein, and without limitation, silicas commercially available from PPG Industries under the Hi-Sil trademark with designations 210, 315G, EZ160G, etc.; silicas available from Solvay, with, for example, designations of Z1165MP and Premium200MP, etc. and silicas available from Evonik AG with, for example, designations VN2 and Ultrasil 6000GR, 9100GR, etc.

In still another embodiment, the rubber composition may comprise pre-silanized and precipitated silica which may for instance have a CTAB adsorption surface area of between 130 $m^2$/g and 210 $m^2$/g, optionally between 130 $m^2$/g and 150 $m^2$/g and/or between 190 $m^2$/g and 210 $m^2$/g, or even between 195 $m^2$/g and 205 $m^2$/g. The CTAB (cetyl trimethyl ammonium bromide) method for determination of the silica surface area (ASTM D6845) is known to the person skilled in the art.

In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

Optional silica dispersing aids, if used, are present in an amount ranging from about 0.1% to about 25% by weight based on the weight of the silica, with about 0.5% to about 20% by weight being suitable, and about 1% to about 15% by weight based on the weight of the silica also being suitable. Various pre-treated precipitated silicas are described in U.S. Pat. Nos. 4,704,414, 6,123,762 and 6,573, 324. The teachings of U.S. Pat. Nos. 4,704,414, 6,123,762 and 6,573,324 are incorporated herein by reference.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries. Some representative examples of preferred pre-silanized precipitated silicas include Agilon® 400, Agilon® 454 and Agilon® 458 from PPG Industries.

A representative silica coupler (silica coupling agent) having a moiety reactive with hydroxyl groups on pre-silanized precipitated silica and on precipitated silica and another moiety interactive with said elastomers, may be comprised of, for example:
(A) bis(3-trialkoxysilylalkyl) polysulfide containing an average in the range of from about 2 to about 4, alternatively from about 2 to about 2.6 or from about 3.2 to about 3.8, sulfur atoms in its connecting bridge, or (B) an alkoxyorganomercaptosilane, or (C) their combination. Representative of such bis(3-trialkoxysilylalkyl) polysulfide is bis(3-triethoxysilylpropyl) polysulfide. As indicated, for the pre-silanized precipitated silica, the silica coupler may be desirably an alkoxyorganomercaptosilane. For the non-pre-silanized precipitated silica, the silica coupler may be desirably comprised of the bis(3-triethoxysilylpropyl) polysulfide.

In one embodiment, the rubber composition is exclusive of addition of silica coupler to the rubber composition (thereby exclusive of silica coupler).

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized precipitated silica to said precipitated silica is desirably at least 8/1, alternately at least 10/1.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 to 145 g/kg and a DBP number ranging from 34 to 150 cm3/100 g. Iodine absorption values can be suitably determined according to ASTM D1510 or equivalent. Commonly employed carbon blacks can be used as a conventional filler in an amount ranging from 10 to 150 phr. In another embodiment, from 20 to 80 phr of carbon black may be used.

In another embodiment, other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534, 6,207,757, 6,133,364, 6,372,857, 5,395,891, or 6,127,488, and a plasticized starch composite filler including but not limited to that disclosed in U.S. Pat. No. 5,672,639. Such other fillers may be used in an amount ranging from 1 to 30 phr.

In one embodiment, the rubber composition may contain a conventional sulfur containing organosilicon compound or silane. Examples of suitable sulfur containing organosilicon compounds are of the formula:

Z-Alk-S$_n$-Alk-Z      I in which Z is selected from the group consisting of

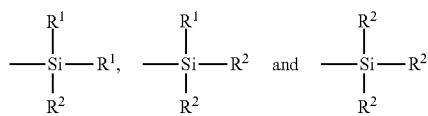

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be of the formula:

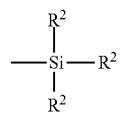

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used. Generally speaking, the amount of the compound may range from 0.5 phr to 20 phr. In one embodiment, the amount will range from 1 phr to 10 phr. In another embodiment, the rubber composition comprises less than 0.1 phr cobalt salt or 0 phr cobalt salt.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively with a range of from 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p- phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are, for instance, amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be, for instance, a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention may, for instance, be carried out at conventional temperatures ranging from 100° C. to 200° C. In one embodiment, the vulcanization is conducted at temperatures ranging from 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In a second aspect, the present invention is directed to a rubber composition comprising 100 phr of one or more, preferably diene-based, elastomers, 30 phr to 200 phr of a filler, and a benzoxazine having at least one of the following structures:

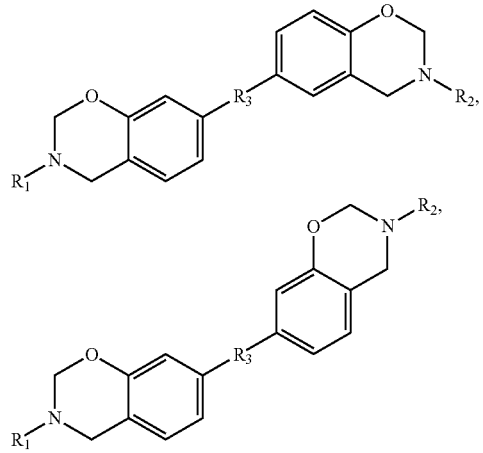

wherein $R_1$ and $R_2$ are selected from aromatic groups, aliphatic groups, cycloaliphatic groups and heterocyclic groups, and wherein $R_3$ is an aromatic group, aliphatic group, cycloaliphatic group, heterocyclic group, hexafluoropropane, monosulfide, or disulfide.

The second aspect and also other aspects mentioned herein may be combined with the embodiments mentioned in the context of other aspects, in particular the first aspect of the invention.

In a third aspect of the present invention, a rubber product is provided, the rubber product comprising the rubber composition according to the above first aspect or in accordance with one or more of its embodiments.

In one embodiment, the rubber product is selected from a tire, a power transmission belt, a hose, a track, an air sleeve, and a conveyor belt. The tire can for instance be a pneumatic or a non-pneumatic tire.

In a further embodiment, the rubber product is a tire, comprising one or more rubber components selected from a tread, a rubber shearband, rubber spokes, an undertread, a sidewall, an apex, a flipper, a chipper, a chafer, a carcass, a belt, an overlay, wherein one or more of the rubber components comprising the rubber composition.

In another embodiment, the rubber product is a tire comprising an apex or a tread groove reinforcement comprising the rubber composition. In particular, apex compositions or tread groove reinforcement compositions may benefit from the reinforcement properties of the rubber compositions disclosed herein.

A tire according to an embodiment of the invention may, for example, be a pneumatic tire or nonpneumatic tire, a race tire, a passenger tire, an aircraft tire, an agricultural tire, an earthmover tire, an off-the-road (OTR) tire, a truck tire or a motorcycle tire. The tire may also be a radial or bias tire.

In a fourth aspect, the present invention is directed to a method of making a rubber composition comprising one or more of the following steps:

A. Reacting, in a first step, (or in other words pre-reacting) a diphenol with an amine, in particular a primary amine, in the presence of an aldehyde derivative (preferably formaldehyde) to obtain a benzoxazine, wherein the diphenol comprises a bridge linking or connecting both phenol groups of the diphenol, and wherein said bridge is connected at at least one of its respective ends to a meta position of the respective phenol group;
B. Mixing an elastomer and a filler in a second step;
C. Adding the benzoxazine in a third step (including the option that the mixing of step
B continues while adding the benzoxazine in step C);
D. Curing the rubber composition.

Further steps may be added between the above mentioned steps.

The features of the above aspects and/or embodiments may be combined with one another.

FIG. 1 is a schematic cross-section of a tire 1 according to an embodiment of the invention. The tire 1 has a plurality of tire components such as a tread 10, an innerliner 13, a belt comprising four belt plies 11, a carcass ply 9, two sidewalls 2, and two bead regions 3, bead filler apexes 5 and beads 4. The tire 1 is suitable, for example, for mounting on a rim of a vehicle, e.g. a truck or a passenger car. As shown in FIG. 1, the belt plies 11 may be covered by an overlay ply 12 and/or may include one or more breaker plies. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7 which are also considered as tire components. As shown in FIG. 1, the example tread 10 may have circumferential grooves 20, each groove 20 essentially defining a U-shaped opening in the tread 10. The main portion of the tread 10 may be formed of one or more tread compounds. Moreover, the grooves 20, in particular the bottoms and/or sidewalls of the grooves 20 could be reinforced by a rubber compound having a higher hardness and/or stiffness than the remaining tread compound. Such a reinforcement may be referred to herein as a groove reinforcement.

While the embodiment of FIG. 1 suggests a plurality of tire components including for instance apexes 5, chippers 7, flippers 8, and overlay 12, such and further components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance a different number of grooves 20, e.g. less than four grooves.

One or more of the above tire components are made of a rubber composition in accordance with an embodiment of the present invention which comprises a benzoxazine based on the reaction of (i) a diphenol comprising two phenol groups and a bridge covalently connecting the two phenol groups, (ii) an aldehyde derivative, and (iii) an amine, wherein the bridge is connected to at least one of the phenol groups at a meta position of said at least one phenol group.

In a first embodiment, such a rubber composition can comprise 3,3'-dihydroxy diphenyl disulfide-furfuryl amine having the following structure:

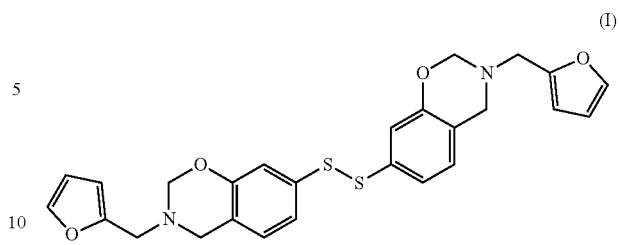

In this molecule according to structure (I), a disulfide bridge is linking both phenyl groups at a meta position, leaving the respective para positions free.

In another preferred embodiment, the benzoxazine is 3,3'-dihydroxydiphenyl disulfide ethanol amine is as shown in below structure II:

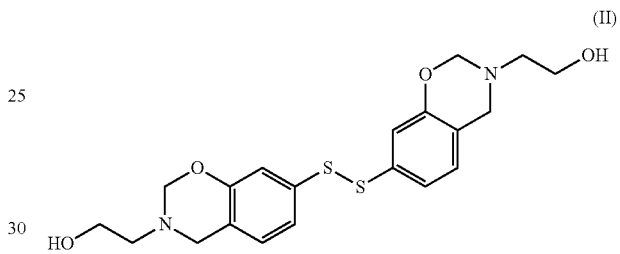

In structure II, the sulfur bridge is connected to the phenyl groups at the meta position as well.

In yet another embodiment, the benzoxazine is 3,3'-dihydroxydiphenyl disulfide aniline, as shown in below structure III:

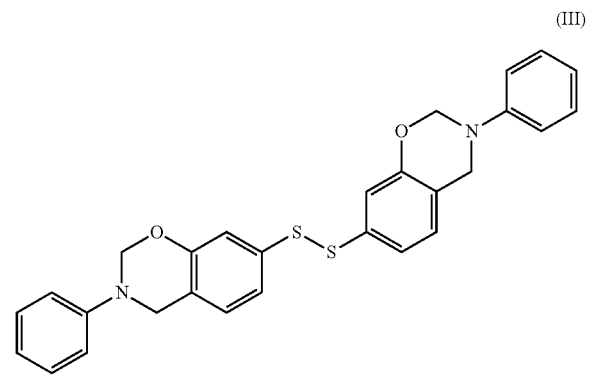

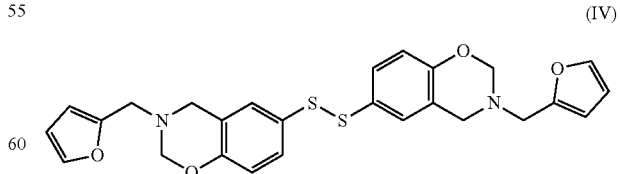

Structure IV, not in accordance with the present invention, represents bis (4-hydroxyphenyl disulfide furfuryl amine), in which a disulfide bridges both phenyl groups in para position.

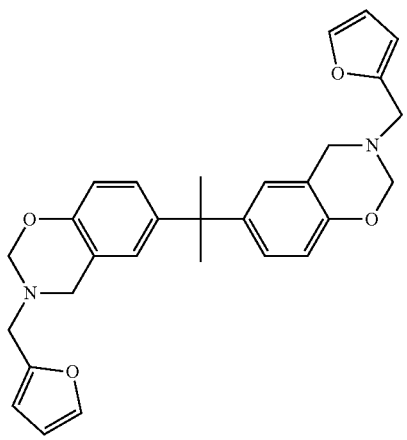

(V)

Above structure V, also not in accordance with the present invention, is bisphenol A furfuryl amine, in which a bridge (i.e. dimethyl methane) is coupled also in para position of the phenyl groups.

This invention is illustrated by the following examples that are merely for the purpose of illustration and are not to be regarded as limiting the scope of the invention or the manner in which it can be practiced. Unless specifically indicated otherwise, parts and percentages are given by weight.

The formulation that was used for this study is presented in Table 1. The first and second stages were mixed as a masterbatch. The resins were introduced in the third stage followed by a productive stage.

TABLE 1

| Model Formulation Used for this Evaluation | |
|---|---|
| First Stage | 2 minutes @ 160° C. |
| Silane Functionalized SBR | 70 phr |
| Budene ® 1207 high-cis-1,4-polybutadiene rubber | 30 phr |
| Zeosil 1165 MP silica | 70 phr |
| N330 Carbon Black | 2 phr |
| Si 266 silica coupling agent | 7 phr |
| Processing oil | 20 phr |
| Waxes | 1.5 phr |
| Stearic acid | 3 phr |
| Antioxidant | 0.5 phr |
| Second Stage | Drop @ 150° C. |
| N330 carbon black | 3 phr |
| Zinc oxide | 1.5 phr |
| Antioxidant | 1.5 phr |
| Third Stage | Drop @ 170° C. |
| N330 carbon black | 3 phr |
| Resin | 0 phr or 10 phr |
| Productive Stage | Drop @ 100° C. |
| Antioxidant | 0.75 phr |
| Diphenyl guanidine | 2 phr |

TABLE 1-continued

| Model Formulation Used for this Evaluation | |
|---|---|
| CBS Accelerator | 1.4 phr |
| Sulfur | 1.4 |

Three benzoxazine resins were evaluated and their properties are listed in Table 2. The chemical structures of Araldite® 35610 benzoxazine resin and Araldite® 35700 series benzoxazine resin are shown below.

TABLE 2

| Benzoxazine Resin | Tg by DSC (° C.) |
|---|---|
| XU 35610 (BPA) | 161 |
| Araldite ® MT 35700 (BPF) | 145-155 |
| Araldite ® MT 35710 (FST) | 137 |

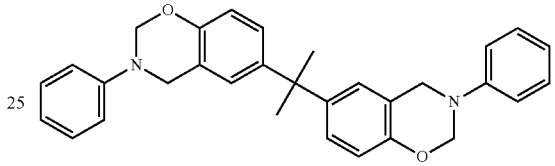

Araldite® 35610 benzoxazine resin

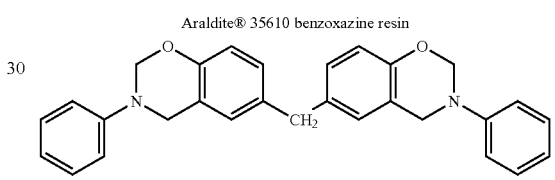

Araldite® 35700 series benzoxazine resins

Araldite® MT 35700 by Huntsman is a bisphenol-F based benzoxazine. It is a di-functional thermoset resin and can be homopolymerized or co-reacted with epoxy or phenolic resins to produce polymers with extremely good thermal and mechanical properties. It is available in solvent (75% in MEK). Araldite® MT 35700 exhibits good flammability resistance, excellent chemical resistance, low water absorption, dimensional stability and high modulus properties.

The evaluations were begun by a simple addition of the resins in the control recipe. In the procedure used, 10 phr of resin was used and no further adjustment was made. Results are shown in Table 3. It was hypothesized that the resins could participate in the cure as expected from the decrease in δ Torque and increase of T90 (Table 3). This led to a substantial increase of the elongation at break for the samples with the benzoxazine resins and a decrease of the 300% modulus while the tensile stress values were maintained. Interestingly though the low strain RPA stiffness of the compounds did increase but dropped significantly after the first strain cycle. Hysteresis was also affected negatively which again was probably a result of the effect on the cure.

TABLE 3

Compounding results of the benzoxazine addition in the model formulation

| Resin | | R1-None | R2-35610 | R3-35700 | R4-35710 |
|---|---|---|---|---|---|
| Cure Profile (30 mins at 160 C.) | | | | | |
| Delta Torque | dNm | 8.9 | 6.1 | 6.7 | 6.2 |
| Time@25% cure S' | min | 2.8 | 3.0 | 3.5 | 3.4 |
| Time@90% cure S' | min | 6.9 | 17.5 | 17.2 | 14.6 |
| 1st Strain Sweep | | | | | |
| G'@1.000% | kPa | 2480.5 | 2994.4 | 3255.8 | 2796.0 |
| G'@10.000% | kPa | 1734.7 | 1613.8 | 1780.3 | 1598.4 |
| tanD@1.000% | [ ] | 0.101 | 0.171 | 0.161 | 0.166 |
| tanD@10.000% | [ ] | 0.111 | 0.218 | 0.205 | 0.203 |
| 2nd Strain Sweep | | | | | |
| G'@1.000% | kPa | 2119.5 | 2248.0 | 2444.8 | 2161.1 |
| G'@10.000% | kPa | 1629.3 | 1484.6 | 1633.2 | 1483.2 |
| tanD@1.000% | [ ] | 0.115 | 0.206 | 0.2 | 0.196 |
| tanD@10.000% | [ ] | 0.117 | 0.224 | 0.212 | 0.21 |
| Tensile | | | | | |
| Mod@100% | (MPa) | 2.7 | 1.6 | 1.8 | 1.7 |
| Mod@300% | (MPa) | 12.6 | 5.5 | 6.4 | 6.1 |
| Tensile stress at Maximum | (MPa) | 17.1 | 16.0 | 17.1 | 18.0 |
| Tensile strain at Maximum | (%) | 373.6 | 609.3 | 591.3 | 625.4 |
| Energy at Maximum | (J) | 10.5 | 17.0 | 16.5 | 17.3 |

The evaluation was continued by changing the cure ingredients one ingredient at a time. The level of sulfur and accelerator were varied to probe their effect. From the results in Table 4 it was clear that the cure state is affected by the benzoxazine resins. Increasing the level of diphenyl guanidine and accelerator alone did not change the cure behavior. It appears that the benzoxazine resins "consume" sulfur during the cure. From these adjustments the T90 and the elongation at break values showed a lot more room for further adjustment. In any case, directionally all the properties moved in a beneficial direction.

TABLE 4

Compounding results of the benzoxazine addition in the cure adjusted formulation

| Resin 35610 | | 10 | 10 | 10 | 10 |
|---|---|---|---|---|---|
| DPG | 2 | 2 | 2 | 2 | 3 |
| accelerator | 1.4 | 1.4 | 2.1 | 2.1 | 1.4 |
| sulfur | 1.4 | 2.1 | 1.4 | 2.1 | 1.4 |
| Cure Profile (30 minutes at 160° C.) | | | | | |
| Delta Torque, dNm | 8.2 | 7.7 | 6.5 | 8.3 | 6.5 |
| Time@90% cure S', min. | 6.2 | 16.7 | 11.3 | 11.6 | 18.0 |
| First Strain Sweep | | | | | |
| G' @ 1%, kPa | 2188 | 3128 | 2922 | 3127 | 2904 |
| G' @ 10%, kPa | 1590 | 1781 | 1633 | 1825 | 1601 |
| tanδ @ 1% | 0.095 | 0.134 | 0.154 | 0.113 | 0.162 |
| tanδ @ 10% | 0.106 | 0.178 | 0.197 | 0.167 | 0.207 |
| Second Strain Sweep | | | | | |
| G' @ 1%, kPa | 1911 | 2436 | 2242 | 2475 | 2217 |
| G' @ 10%, kPa | 1514 | 1653 | 1516 | 1702 | 1476 |
| tanδ @ 1% | 0.108 | 0.166 | 0.187 | 0.151 | 0.194 |
| tanδ @ 10% | 0.111 | 0.184 | 0.202 | 0.172 | 0.213 |
| Tensile Properties | | | | | |
| Tensile Stress @ Maximum, MPa | 14.6 | 18.2 | 19.0 | 18.0 | 19.2 |
| Tensile Strain @ Maximum, MPa | 322 | 486 | 569 | 428 | 587 |
| Energy @ Maximum, J | 7.1 | 13.4 | 17.2 | 12.3 | 16.5 |

It was clear that the combination level of accelerator and sulfur needed was underestimated and a subsequent evaluation at higher loadings was undertaken. The results of this further evaluation are presented in Table 5. It was obvious that with this adjustment the cure behavior was almost matched. The elongation at break dropped significantly to almost the level of the control. There was a tremendous increase of stiffness which was also apparent even after the first strain sweep. In addition, the hysteresis was a lot closer to that of the control. It was interesting to see that these resins provided the means, through a resin-sulfur hypothesized network, to an increased stiffness with some sacrifice in hysteresis and tensile properties. It would be interesting in the future to evaluate these materials in compound applications where a stiffness increase is desired and hysteresis or tensile properties adjustments are allowed. A potential candidate could be compounds containing the Agilon 400 (CTS) silica.

TABLE 5

Compounding results of the benzoxazine addition in the final cure adjusted formulation

| | | | |
|---|---|---|---|
| Resin 35700 | | 10 | |
| Resin 35710 | | | 10 |
| Productive Compound | | | |
| Accelerator | 1.4 | 3.4 | 3.4 |
| Sulfur | 1.4 | 3.4 | 3.4 |
| Cure Profile (30 minutes @ 160° C.) | | | |
| Delta Torque, dNm | 8.2 | 11.5 | 11.1 |
| Time@90% cure S', min. | 3.0 | 2.7 | 2.8 |
| First Strain Sweep | | | |
| G' @ 1%, kPa | 2188 | 3564 | 3155 |
| G' @ 10%, kPa | 1590 | 2216 | 2065 |
| tanδ @ 1% | 0.095 | 0.077 | 0.078 |
| tanδ @ 10% | 0.106 | 0.125 | 0.124 |
| Second Strain Sweep | | | |
| G' @ 1%, kPa | 1910 | 2884 | 2648 |
| G' @ 10%, kPa | 1514 | 2166 | 2040 |
| tanδ @ 1% | 0.108 | 0.107 | 0.104 |
| tanδ @ 10% | 0.111 | 0.140 | 0.132 |
| Tensile Properties | | | |
| Tensile Stress @ Maximum, MPa | 14.6 | 16.4 | 14.9 |
| Tensile Strain @ Maximum, MPa | 322 | 275 | 249 |
| Energy @ Maximum, J | 7.1 | 7.4 | 5.9 |

From these experiments it is apparent that these benzoxazine resins participate in the cure and the formulations were adjusted to accommodate this finding. After cure adjustments, these resins presented a system with increased stiffness and without significant deterioration of hysteresis and tensile properties While certain representative embodiments and details have been shown for the purpose of illustrating the subject invention, it will be apparent to those skilled in this art that various changes and modifications can be made therein without departing from the scope of the subject invention.

What is claimed is:

1. A tire which is comprised of a generally toroidal-shaped carcass with an outer circumferential tread which is adapted to be ground contacting, two spaced beads, at least one ply extending from bead to bead and sidewalls extending radially from and connecting said tread to said beads, two rubber apexes which are located radially above the beads, wherein the apexes are comprised of a rubbery polymer and from 30 phr to 80 phr of a benzoxazine resin, wherein the benzoxazine has at least one of the following structures:

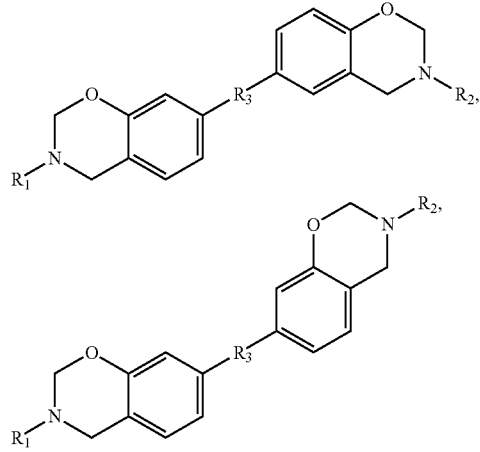

wherein $R_1$ and $R_2$ are selected from: ethanol, allyl, methyl, ethyl, propyl, isopropyl, hexyl, cyclohexyl, fluorene, phenyl acetylene, propargyl ether benzyl, benzonitrile, furfuryl, and benzyl groups, and wherein $R_3$ is a disulfide.

2. The tire as specified in claim 1 wherein the rubbery polymer is comprised of styrene-butadiene rubber.

3. The tire as specified in claim 2 wherein the rubbery polymer is further comprised of polybutadiene rubber.

4. The tire as specified in claim 3 wherein the rubbery polymer is comprised of 60 phr to 80 phr of the styrene-butadiene rubber and from 20 phr to 40 phr of the polybutadiene rubber.

5. The tire as specified in claim 1 wherein the apexes include from 35 phr to 70 phr of the benzoxazine resin.

6. The tire as specified in claim 1 wherein the rubbery polymer is void of isoprene containing polymers.

7. The tire as specified in claim 1 wherein the benzoxazine is 3,3'-dihydroxydiphenyl disulfide ethanol amine.

8. A tire which is comprised of a generally toroidal-shaped carcass with an outer circumferential tread which is adapted to be ground contacting, two spaced beads, at least one ply extending from bead to bead and sidewalls extending radially from and connecting said tread to said beads, two rubber apexes which are located radially above the beads, wherein the apexes are comprised of a rubbery polymer and from 30 phr to 80 phr of a benzoxazine resin, wherein the benzoxazine has at least one of the following structures:

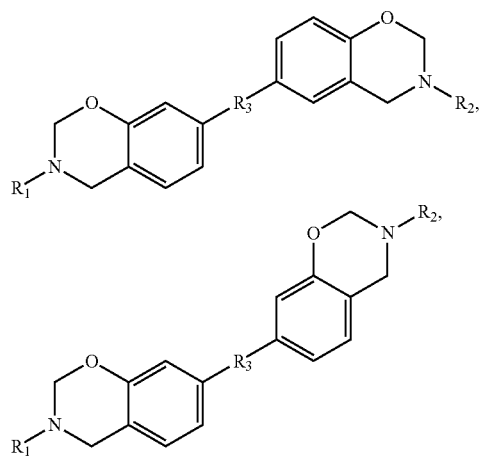

wherein $R_1$ and $R_2$ are selected from aromatic groups, aliphatic groups, cycloaliphatic groups and heterocyclic groups, and wherein $R_3$ is a disulfide.

9. The tire as specified in claim 8 wherein the rubbery polymer is comprised of 60 phr to 80 phr of a styrene-butadiene rubber and from 20 phr to 40 phr of a polybutadiene rubber.

10. The tire as specified in claim 8 wherein the apexes include from 35 phr to 70 phr of the benzoxazine resin.

11. The tire as specified in claim 8 wherein the benzoxazine is 3,3'-dihydroxy diphenyl disulfide-furfuryl amine.

12. The tire as specified in claim 8 wherein the benzoxazine is 3,3'-dihydroxydiphenyl disulfide ethanol amine.

13. The tire as specified in claim 8 wherein the benzoxazine is 3,3'-dihydroxydiphenyl disulfide aniline.

14. The tire as specified in claim 1 wherein the benzoxazine is 3,3'-dihydroxy diphenyl disulfide-furfuryl amine.

15. A rubber composition which is comprised of a polydiene rubber, from 30 phr to 80 phr of a benzoxazine resin, and at least 30 phr of silica; wherein the polydiene rubber is comprised of 60 phr to 80 phr of styrene-butadiene rubber and from 20 phr to 40 phr of polybutadiene rubber, wherein the benzoxazine has at least one of the following structures:

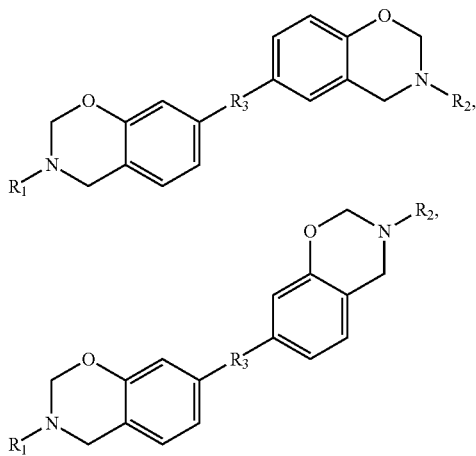

wherein $R_1$ and $R_2$ are selected from ethanol, allyl, methyl, ethyl, propyl, isopropyl, hexyl, cyclohexyl, fluorene, phenyl acetylene, propargyl ether benzyl, benzonitrile, furfuryl, and benzyl groups; and wherein $R_3$ is a disulfide.

16. The rubber composition of claim 15 wherein the silica is a pretreated silica, and wherein the pretreated silica is treated with at least one sulfur containing functional moiety capable of participating in sulfur vulcanization.

17. A tire which is comprised of a generally toroidal-shaped carcass with an outer circumferential tread which is adapted to be ground contacting, two spaced beads, at least one ply extending from bead to bead, sidewalls extending radially from and connecting said tread to said beads, and a chafer positioned around at least a portion of each of said beads, wherein the chafer is adapted for contacting a rigid rim of a wheel, wherein said chafer is comprised of the rubber composition of claim 15.

18. The tire as specified in claim 17 wherein the rubber composition is void of isoprene containing polymers.

19. The tire as specified in claim 17 wherein the silica is a pretreated silica, and wherein the pretreated silica is treated with at least one sulfur containing functional moiety capable of participating in sulfur vulcanization.

20. A tire which is comprised of a generally toroidal-shaped carcass with an outer circumferential tread which is adapted to be ground contacting, two spaced beads, at least one ply extending from bead to bead, and sidewalls extending radially from and connecting said tread to said beads, wherein said tread is comprised of soft tread segments and hard tread segments, and wherein the hard tread segments are comprised of the rubber composition of claim 15.

\* \* \* \* \*